(12) United States Patent
Liu

(10) Patent No.: US 11,234,181 B2
(45) Date of Patent: Jan. 25, 2022

(54) METHOD AND DEVICE FOR DETERMINING SERVICE PATH

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 59 days.

(21) Appl. No.: 16/743,433

(22) Filed: Jan. 15, 2020

(65) Prior Publication Data

US 2020/0154337 A1  May 14, 2020

Related U.S. Application Data

(63) Continuation of application No. PCT/CN2017/096939, filed on Aug. 10, 2017.

(51) Int. Cl.
*H04W 40/12* (2009.01)
*H04W 28/02* (2009.01)
(Continued)

(52) U.S. Cl.
CPC ....... *H04W 40/12* (2013.01); *H04W 28/0268* (2013.01); *H04W 28/24* (2013.01);
(Continued)

(58) Field of Classification Search
CPC . H04W 40/12; H04W 40/28; H04W 28/0268; H04W 28/24; H04W 36/0022;
(Continued)

(56) References Cited

U.S. PATENT DOCUMENTS 7,260,399 B1 * 8/2007 Oh ................ H04W 36/24
370/331
9,713,036 B2 * 7/2017 Laselva ............... H04B 17/309
(Continued)

FOREIGN PATENT DOCUMENTS

CN  101835235 A  9/2010
CN  101951663 A  1/2011
(Continued)

OTHER PUBLICATIONS

The Partial Search Report of corresponding European application No. 17921168.5, dated Mar. 23, 2020 (Year: 2020).*
(Continued)

*Primary Examiner* — Robert C Scheibel
(74) *Attorney, Agent, or Firm* — Ladas & Parry LLP

(57) ABSTRACT

The embodiments of the present application disclose a method and a device for determining a service path, where the method includes: obtaining service performance information of a current service of a terminal device; switching, according to the service performance information, a service path of the current service from a first service path to a second service path, where the service path is a path used by the terminal device to access a network. The method and device according to the embodiments of the present application may improve the user experience of the terminal.

11 Claims, 3 Drawing Sheets

(51) Int. Cl.
*H04W 28/24* (2009.01)
*H04W 36/00* (2009.01)
*H04W 36/14* (2009.01)
*H04W 36/26* (2009.01)
*H04W 36/30* (2009.01)
*H04W 40/28* (2009.01)
*H04W 48/18* (2009.01)
*H04W 88/06* (2009.01)

(52) U.S. Cl.
CPC ....... *H04W 36/0022* (2013.01); *H04W 36/14* (2013.01); *H04W 36/26* (2013.01); *H04W 36/30* (2013.01); *H04W 40/28* (2013.01); *H04W 48/18* (2013.01); *H04W 88/06* (2013.01)

(58) Field of Classification Search
CPC ..... H04W 36/14; H04W 36/26; H04W 36/30; H04W 48/18; H04W 88/06
See application file for complete search history.

(56) References Cited

U.S. PATENT DOCUMENTS

| | | | | |
|---|---|---|---|---|
| 9,838,054 | B2* | 12/2017 | Zhao | H04B 1/1081 |
| 2012/0196644 | A1* | 8/2012 | Scherzer | H04W 48/18 455/524 |
| 2014/0024383 | A1 | 1/2014 | Rahman et al. | |
| 2015/0319662 | A1* | 11/2015 | Enomoto | H04W 48/18 370/338 |
| 2015/0382269 | A1* | 12/2015 | Liang | H04B 7/0632 370/332 |
| 2016/0021673 | A1* | 1/2016 | Ahmadzadeh | H04N 21/63 370/331 |
| 2016/0360445 | A1* | 12/2016 | Eason | H04L 43/16 |
| 2016/0373339 | A1* | 12/2016 | Teyeb | H04W 40/34 |
| 2017/0118706 | A1* | 4/2017 | Wang | H04W 48/20 |
| 2017/0251401 | A1* | 8/2017 | Comstock | H04W 88/06 |
| 2017/0272962 | A1* | 9/2017 | Lu | H04W 8/082 |
| 2017/0339672 | A1* | 11/2017 | Tajima | H04W 36/14 |
| 2017/0347063 | A1* | 11/2017 | Singh | H04W 76/15 |
| 2017/0353874 | A1* | 12/2017 | Harrang | H04L 43/0864 |

FOREIGN PATENT DOCUMENTS

| | | |
|---|---|---|
| CN | 102111838 A | 6/2011 |
| CN | 102223677 A | 10/2011 |
| WO | 2016049562 A1 | 3/2016 |

OTHER PUBLICATIONS

The European Search Opinion for corresponding European application No. 17921168.5, dated Jun. 26, 2020 (Year: 2020).*
The Partial Search Report of corrrespsonding European application No. 17921168.5, dated Mar. 23, 2020.
International Search Report (ISR) with an English translation dated Dec. 28, 2017 for International Application No. PCT/CN2017/096939.
The EESR of corresponding European application No. 17921168.5, dated Jun. 26, 2020.
3GPP TS 36.300 V13.2.0 (Dec. 2015); 3rd Generation Partnership Project;Technical Specification Group Radio Access Network; Evolved Universal Terrestrial Radio Access (E-UTRA) and Evolved Universal Terrestrial Radio Access Network (E-UTRAN);Overall description Stage 2(Release 13).
3GPP TS 23.161 V14.0.0 (Mar. 2017); 3rd Generation Partnership Project;Technical Specification Group Services and System Aspects;Network-Based IP Flow Mobility (NBIFOM);Stage 2(Release 14).
The first Office Action of corresponding India application No. 202017001609, dated Mar. 31, 2021.
The first Office Action of corresponding European application No. 17921168.5, dated Apr. 21, 2021.
The first Office Action of corresponding Chilean application No. 201901856, dated Jul. 5, 2021.

* cited by examiner

METHOD AND DEVICE FOR DETERMINING SERVICE PATH

CROSS-REFERENCE TO RELATED APPLICATIONS

This application is a continuation of International Application No. PCT/CN2017/096939 filed on Aug. 10, 2017, the content of which is incorporated herein by reference in its entirety.

TECHNICAL FIELD

The embodiments of the present application relate to the field of communications and, more particularly, to a method and device for determining a service path.

BACKGROUND

In a 5G system, a terminal device may access a service through a 3rd Generation Partnership Project (3GPP) network or a non-3GPP network. Specifically, the network side has a service access network node that may be responsible for managing the service accessed through the 3GPP network or the non-3GPP network.

Therefore, for a terminal device or a service access network node, how to choose an appropriate service access path to improve user experience is an urgent problem to be solved.

SUMMARY

In view of this, the embodiments of the present application provide a method and device for determining a service path, which may improve user experience.

In a first aspect, a method for determining a service path is provided, where the method includes: obtaining service performance information of a current service of a terminal device; switching, according to the service performance information, a service path of the current service from a first service path to a second service path, where the service path is a path used by the terminal device to access a network.

In an embodiment, the service path is a path used by the terminal device to access a service access management node.

User experience of the terminal may be improved by monitoring the service performance of the current service to trigger the switching of the service path for the terminal device to access the network.

In a possible implementation form, the first service path is a non 3rd Generation Partnership Project (non-3GPP) access path, and the second service path is a 3GPP access path; or the first service path is the 3GPP access path, and the second service path is the non-3GPP access path.

In a possible implementation form, the service performance information includes throughput information and/or time delay information, and the switching, according to the service performance information, a service path of the current service from a first service path to a second service path, includes: switching the service path of the current service from the first service path to the second service path in case that the throughput information and/or the time delay information meets a trigger condition.

In a possible implementation form, the trigger condition is configured by a network device, or is a rule that is agreed by using the protocol and is preset in the terminal device, or is agreed by signing a contract by the terminal device.

In a possible implementation form, the switching the service path of the current service from the first service path to the second service path in case that the throughput information meets a trigger condition, includes: switching the service path of the current service from the first service path to the second service path in case that throughput of the current service is less than a first threshold.

In a possible implementation form, switching the service path of the current service from the first service path to the second service path in case that the throughput information meets a trigger condition, includes: switching the service path of the current service from the first service path to the second service path in case that reduction speed of throughput of the current service is greater than a second threshold.

In a possible implementation form, switching the service path of the current service from the first service path to the second service path in case that the time delay information meets a trigger condition, includes: switching the service path of the current service from the first service path to the second service path in case that time delay of the current service is greater than a third threshold.

In a possible implementation form, switching the service path of the current service from the first service path to the second service path in case that the time delay information meets a trigger condition, includes: switching the service path of the current service from the first service path to the second service path in case that time delay jitter of the current service is greater than a fourth threshold.

In a possible implementation form, the obtaining service performance information of a current service of a terminal device, includes: obtaining the service performance information from a core network device, or from the terminal device, or from a device storing subscription information of the terminal device.

In a possible implementation form, the method is performed by the terminal device or by the service access management node.

In a second aspect, a method for determining a service path is provided, where the method includes: determining, according to quality of service (QoS) information of a to-be-initiated service of a terminal device, a target service path for the terminal device to access a network, accessing, according to the target service path, the terminal device to the network.

In an embodiment, the terminal device is accessed to a service access management node according to the target service path.

The user experience of the terminal may be improved by determining the service path for the terminal device to access the network by using the QoS information of the to-be-initiated service.

In a possible implementation form, the target service path includes a non 3rd Generation Partnership Project (non-3GPP) access path or a 3GPP access path.

In a possible implementation form, the determining, according to the QoS information of a to-be-initiated service of a terminal device, a target service path for the terminal device to access a network, includes: determining the target service path according to at least one of the following information: a QoS identifier, a source type, a priority, a service time delay requirement and a data packet error rate, and a first rule.

In a possible implementation form, the first rule is configured by a network device, or is a rule that is agreed by using the protocol and is preset in the terminal device, or is agreed by signing a contract by the terminal device.

In a possible implementation form, the first rule is a first correspondence relationship between the QoS identifier and the service path, and determining, according to the QoS identifier and the first rule, the target service path, includes: determining, according to the QoS identifier and the first correspondence, the target service path.

In a possible implementation form, the first rule is a second correspondence relationship between the source type and the service path, and the determining, according to the source type, the target service path, includes: determining, according to the source type and the second correspondence, the target service path.

In a possible implementation form, the determining, according to the priority and the first rule, the target service path, includes: determining the target service path as the 3GPP access path in case that the priority is greater than or equal to a first threshold; determining the target service path as the non-3GPP access path in case that the priority is less than the first threshold.

In a possible implementation form, the determining, according to the service time delay requirement and the first rule, the target service path, includes: determining the target service path as the non-3GPP access path in case that the service time delay requirement is greater than or equal to the first threshold; determining the target service path as the 3GPP access path in case that the service time delay requirement is less than the first threshold.

In a possible implementation form, the determining, according to the data packet error rate and the first rule, the target service path, includes: determining the target service path as the non-3GPP access path in case that the data packet error rate is greater than or equal to the first threshold; determining the target service path as the 3GPP access path in case that the data packet error rate is less than the first threshold.

In a possible implementation form, the method further includes: obtaining the QoS information of the to-be-initiated service.

In a possible implementation form, the obtaining the QoS information of the to-be-initiated service, includes: obtaining the service performance information from a core network device, or from the terminal device, or from a device storing subscription information of the terminal device.

In a possible implementation form, the method is performed by the terminal device or by the service access management node.

In a third aspect, a device for determining a service path is provided for performing the method according to the above first aspect or to above any one of the possible implementation forms of the first aspect. In particular, the device includes a unit for performing the method according to the above first aspect or to above any one of the possible implementation forms of the first aspect.

In a fourth aspect, a device for determining a service path is provided for performing the method according to the above second aspect or to above any one of the possible implementation forms of the second aspect. In particular, the device includes a unit for performing the method according to the above second aspect or to above any one of the possible implementation forms of the second aspect.

In a fifth aspect, a device for determining a service path is provided, where the device includes: a memory, a processor, an input interface, and an output interface. Where the memory, the processor, the input interface, and the output interface are connected by a bus system. The memory is used for storing instructions, and the processor is used for executing the instructions stored in the memory to perform the method according to the above first aspect or to above any one of the possible implementation forms of the first aspect.

In a sixth aspect, a device for determining a service path is provided, where the device includes: a memory, a processor, an input interface, and an output interface. Where the memory, the processor, the input interface, and the output interface are connected by a bus system. The memory is used for storing instructions, and the processor is used for executing the instructions stored in the memory to perform the method according to the above second aspect or to above any one of the possible implementation forms of the second aspect.

In a seventh aspect, a computer storage medium is provided for storing computer software instructions used to perform the method according to the above first aspect or to above any one of the possible implementation forms of the first aspect, or to perform the method according to the above second aspect or to above any one of the possible implementation forms of the second aspect, and includes program designed for performing the above aspects.

In an eighth aspect, a computer program product including instructions is provided that when the instructions are executed on a computer, cause the computer to perform the method according to the above first aspect or to above any one of the possible implementation forms of the first aspect, or to perform the method according to the above second aspect or to above any one of the possible implementation forms of the second aspect.

These and other aspects of the present application will be more readily apparent from the following description of the embodiments.

DESCRIPTION OF EMBODIMENTS

Figure 1:
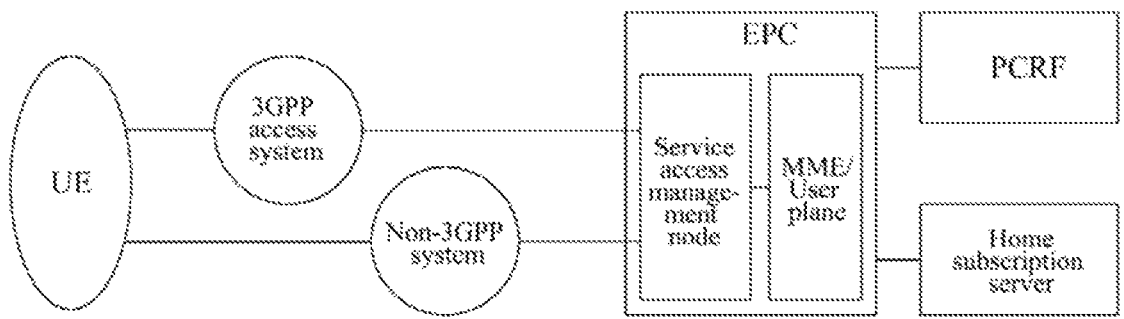
FIG. 1 shows a schematic diagram of an application scenario according to an embodiment of the present application.

The technical solution in the embodiments of the present application will be described clearly and completely in combination with the accompanying drawings in the embodiments of the present application.

It should be understood that the technical solution of the embodiments of the present application may be applied to various communication systems, such as a global system of mobile communication (GSM) system, a code division multiple access (CDMA) system, a wideband code division multiple access (WCDMA) system, a general packet radio service (GPRS) system, A LTE system, a LTE frequency division duplex (FDD) system, a LTE time division duplex (TDD) system, a universal mobile telecommunication system (UMTS), a worldwide interoperability for microwave access (WiMAX) communication system, New Radio (NR) or a future 5G communication system, or the like.

In particular, the technical solution of the embodiments of the present application may be applied to various communication systems based on the non-orthogonal multiple access technology, such as a sparse code multiple access (SCMA) system, and a low density signature (LDS) system, and of course, the SCMA system and the LDS system may also be referred to as other names in the communication field; further, the technical solution of the embodiments of the present application may be applied to multi-carrier transmission system using the non-orthogonal multiple access technology, such as systems using the non-orthogonal multiple access technology of orthogonal frequency division multiplexing (OFDM), filter bank multi-carrier (FBMC), generalized frequency division multiplexing (OFDM)), filtered orthogonal frequency division multiplexing (F-OFDM), or the like.

The terminal device of the embodiments of the present application may refer to user equipment (UE), an access terminal, a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a session initiation protocol (SIP) phone, a wireless local loop (WLL) station, a personal digital assistant (PDA), a handheld device with the wireless communication function, a computing device or other processing devices connected to a wireless modem, a vehicle-mounted device, a wearable device, a terminal device in the future 5G network, or a terminal device in the future evolutional public land mobile network (PLMN), etc., which will not be limited in the embodiments of the present application.

The network device of the embodiments of the present application may be a device for communicating with the terminal device, for example, may be a base transceiver station (BTS) in the GSM or CDMA, or may be NodeB (NB) in the WCDMA system, or may be an Evolutional Node B, eNB or eNodeB in the LTE system, or may be a wireless controller in cloud radio access network (CRAN) scenario, or the network device may be a relay station, an access point, an vehicle-mounted device, a wearable device and a network device in the future 5G network, or a network side device in the future Evolutional PLMN network, etc., which will not be limited in the embodiments of the present application.

FIG. 1 shows a schematic block diagram of an application scenario according to an embodiment of the present application. As shown in FIG. 1, the UE may access an evolved packet core (EPC) through a 3GPP access system or a non-3GPP access system. The EPC mainly includes a mobility management entity (MME), a user plane entity (UPE), and a service access management node. Where the MME is responsible for mobility management of the control plane, including the user context and mobility state management, assigning the user temporary identity, the security function, etc.; UPE is responsible for paging for downlink data in an idle state, and managing the Internet Protocol (IP) bearer parameters and routing information in the network, etc.; the service access management node is mainly responsible for managing the access to the 3GPP access system or the non-3GPP access system. The 3GPP access system usually includes the above-described communication systems such as LTE or WCDMA, while the non-3GPP access system includes a wireless local area network (WLAN), a high rate packet data (HRPD) or worldwide interoperability for microwave access (WiMAX), or the like. It should be understood that the 3GPP access system and the non-3GPP access system of the embodiments of the present application include, but are not limited to, various communication systems described above. The user subscription server in FIG. 1 is the primary user database for the network entity of the IP multimedia subsystem (IMS) that processes the calling/session. It contains user profiles, performs user authentication and authorization, and may provide information about the physical location of the user. The user subscription server may be, for example, a home subscriber server (HSS) in 3GPP. The policy and charging rules Function (PCRF) is the policy and charging control policy decision point of the service data flow and IP bearer resources, and chooses and provides the available policy and charging control decisions for the policy and charging enforcement function (PCEF).

Figure 2:
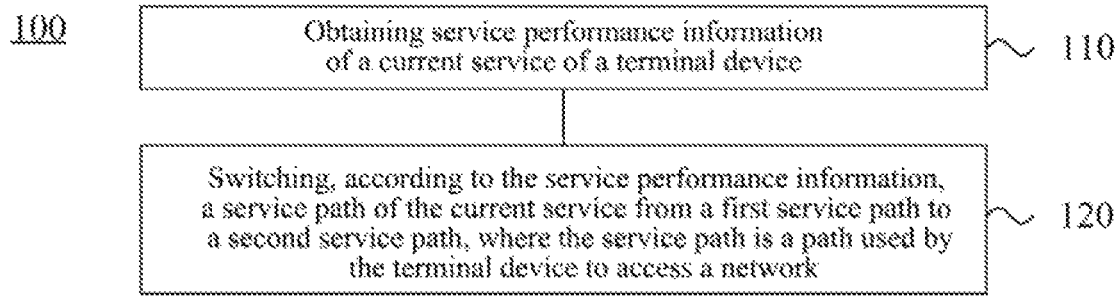
FIG. 2 shows a schematic block diagram of a method for determining a service path according to an embodiment of the present application.

FIG. 2 shows a schematic block diagram of a method 100 for determining a service path according to an embodiment of the present application. As shown in FIG. 2, the method 100 may be performed by a terminal device or a service access management node, and the method 100 includes some or all of the following contents:

S110, obtaining service performance information of a current service of a terminal device;

S120, switching, according to the service performance information, a service path of the current service from a first service path to a second service path, where the service path is a access path used by the terminal device to access a network.

Specifically, in the embodiments of the present application, the terminal device or the service access management node may periodically obtain the service performance information of the current service; if the terminal device or the service access management node determines that some service performances meet the trigger condition, the terminal device or the service access management node may directly switch the service path of the current service. For example, the terminal device currently accesses the network by using LTE. Specifically, the terminal device uses LTE to access the service access management node, and uses the LTE to perform service transmission; when the terminal device determines that some service performances of the current service meet the trigger condition, if the time delay of the current service is greater than a certain threshold, the terminal device may consider that the currently accessed network performance is poor, and may select to directly switch the terminal device to the WLAN system to transmit service that is currently transmitting.

Therefore, the method for determining a service path in the embodiments of the present application may improve the user experience of the terminal by monitoring the service performance of the current service to trigger the switching of the service path for the terminal device to access the network.

As mentioned above, the method according to the embodiments of the present application may be performed by a terminal device, or may be performed by a service access management node, where the service access management node may be a certain functional entity in the core network device or a certain device other than the core network device. The terminal device will be taken as an example to describe the present solution in some places below for the convenience of description, but it should be understood that the following various solutions are equally applicable to the service access management node.

In the embodiments of the present application, the first service path is a non 3rd Generation Partnership Project (non-3GPP) access path, and the second service path is a 3GPP access path; or the first service path is a 3GPP access path, and the second service path is a non-3GPP access path. For example, the first service path may be an LTE network, and the second service path may be a WLAN network. The first service path and the second service path may also be service paths other than the foregoing 3GPP access path and the non-3GPP access path, which will not be limited in the embodiments of the present application.

In the embodiments of the present application, the service performance information of the current service may include throughput information and/or time delay information, or may also be other service performance information, such as a current service rate. Specifically, the terminal device may determine whether these service performances of the current service meet the trigger condition, and if it does, the terminal device is triggered to switch the service path of the current service; if it does not, the terminal device may not switch the service path of the current service, that is, the current service path may be used continuously to continue to process the current service.

It should be understood that the triggering condition for triggering the terminal device to switch the service path may be configured by a network device, or may be a rule that is agreed by using the protocol, such as a factory setting of the terminal device. The trigger condition may also be agreed by signing a contract by the terminal device with the operator, which will not be limited in the embodiments of the present application.

In the embodiment of the present application, the switching the service path of the current service from the first service path to the second service path in case that the throughput information meets a trigger condition, includes: switching the service path of the current service from the first service path to the second service path in case that throughput of the current service is less than a first threshold.

Specifically, the network device may configure a threshold for the throughput in advance, and may configure the trigger condition to be: if the obtained throughput is less than the threshold, the current network performance may be considered to be poor, and the service path is required to be switched. In an embodiment, the trigger condition may also be configured to be: if the obtained throughput is greater than or equal to the threshold, the current network performance may be considered to be better, and the current service path may be used to process the current service without switching the service path.

In the embodiment of the present application, the switching the service path of the current service from the first service path to the second service path in case that the throughput information meets a trigger condition, includes: switching the service path of the current service from the first service path to the second service path in case that reduction speed of throughput of the current service is greater than a second threshold.

Specifically, the network device may configure a threshold for the reduction speed of the throughput in advance, and may configure the trigger condition to be: if the obtained reduction speed of the throughput is greater than the threshold, the current network performance may be considered to be poor, and the service path is required to be switched. In an embodiment, the trigger condition may also be configured to be: if the obtained reduction speed of the throughput is less than or equal to the threshold, the current network performance may be considered to be better, and the current service path may be used to process the current service without switching the service path.

In the embodiments of the present application, the switching the service path of the current service from the first service path to the second service path in case that the time delay information meets a trigger condition, includes: switching the service path of the current service from the first service path to the second service path in case that the time delay of the current service is greater than a third threshold.

Specifically, the network device may configure a threshold for the time delay of the service in advance, and may configure the trigger condition to be: if the obtained time delay of the service is greater than the threshold, the current network performance may be considered to be poor, and the service path is required to be switched. In an embodiment, the trigger condition may also be configured to be: if the obtained time delay of the service is less than or equal to the threshold, the current network performance may be considered to be better, and the current service path may be used to process the current service without switching the service path.

It should be understood that the threshold configured by the network device for the service time delay may also be the service time delay requirement in the Quality of Service (QoS) of the service.

In an embodiment, the network device may further configure a threshold for the speed at which the service time delay is increased, and may configure the trigger condition to be: if the obtained speed at which the service time delay is increased is greater than the threshold, the current network performance may be considered to be poor, and the service path is required to be switched. In an embodiment, the trigger condition may also be configured to be: if the obtained speed at which the service time delay is increased is less than or equal to the threshold, the current network performance may be considered to be better, and the current service path may be used to process the current service path without switching the service path.

In the embodiments of the present application, the switching the service path of the current service from the first service path to the second service path in case that the time delay information meets a trigger condition, includes: switching the service path of the current service from the first service path to the second service path in case that time delay jitter of the current service is greater than a fourth threshold.

Specifically, the network device may configure a threshold for the time delay jitter of the service in advance, and may configure the trigger condition to be: if the obtained time delay jitter of the service is greater than the threshold, the current network performance may be considered to be poor, and the service path is required to be switched. In an embodiment, the trigger condition may also be configured to be: if the obtained time delay jitter of the service is less than or equal to the threshold, the current network performance may be considered to be better, and the current service path may be used to process the current service without switching the service path.

Similarly, the network device may also configure a threshold in advance for the speed at which the time delay jitter of the service is increased. The triggering conditions refer to various embodiments described above, and will not be repeated herein for brevity.

It should be understood that in the embodiments of the present application, the above is described by taking various service performances such as the size of the throughput, the reduction speed of the throughput, the time delay, the time delay jitter and so on as examples, and the embodiments of the present application are not limited thereto.

It should also be understood that the trigger condition is described above based on the relationship between various service performances and thresholds, and the trigger condition may also be a functional relationship. For example, it may be agreed for the trigger condition to be that the throughput of the service increases exponentially, so that the terminal device may be triggered to switch the service path.

In the embodiments of the present application, the obtaining service performance information of a current service of a terminal device, includes: obtaining the service performance information from a core network device, or from the terminal device, or from a device storing subscription information of the terminal device.

It should also be understood that the various thresholds described above may be configured by the network device, or may be a value that is agreed by using the protocol and preset in the terminal device, or may also be agreed by signing a contract by the terminal device with the operator.

For example, if the method is performed by the terminal device, the service performance of the terminal device may be monitored in real time by the core network device or by the device storing the subscription information of the terminal device, and the terminal device may periodically send a request message to the core network device to request the core network device to send, to the terminal device, the monitored service performance information of the terminal device or the service performance information of the terminal device obtained from the device storing the subscription information of the terminal device. The terminal device may also monitor the service performance of the terminal device in real time. For another example, if the method is performed by the service access management node, the service performance of the terminal device may be monitored in real time by the service access management node or by the terminal device, or may be monitored by the control node in the core network device, such as MME, and the service access management node sends the request information to the terminal device or to the MME to request to send the monitored service performance information of the terminal device to the service access management node.

In the embodiments of the present application, the accessing, according to the target service path, the terminal device to the network, includes: accessing, according to the target service path, the terminal device to the service access management node.

Figure 3:
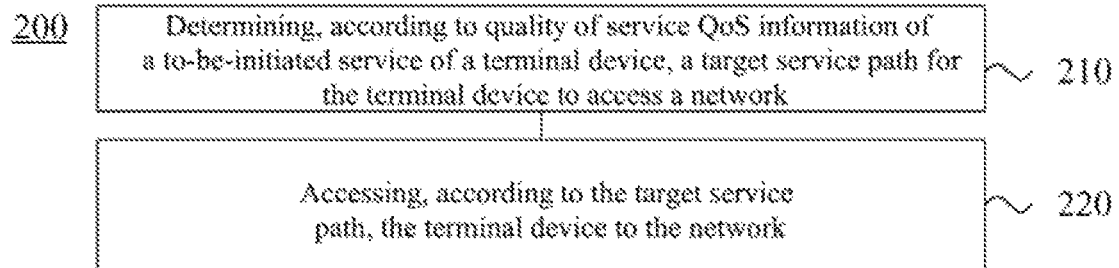
FIG. 3 shows another schematic block diagram of a method for determining a service path according to an embodiment of the present application.

FIG. 3 shows a schematic block diagram of a method 200 for determining a service path according to an embodiment of the present application. As shown in FIG. 3, the method 200 may be performed by a terminal device or a service access management node, and the method 200 includes some or all of the following contents:

S210, determining, according to quality of service (QoS) information of a to-be-initiated service of a terminal device, a target service path for the terminal device to access a network;

S220, accessing, according to the target service path, the terminal device to the network.

Specifically, in the embodiments of the present application, the network device may configure in advance different service paths for different QoS values of the same type of QoS information. For example, the network device may configure in advance the time delay in the QoS as a time delay 1 corresponding to a service path 1, the time delay in the QoS as a time delay 2 corresponding to a service path 2, then the terminal device or the service access management node may obtain the QoS information of the to-be-initiated service before the service is initiated, and the terminal device may determine which kinds of service path corresponds to according to the time delay of the QoS information of the to-be-initiated service. After determining which kinds of service path is, the terminal device may access the network through the service path.

Therefore, the method for determining a service path in the embodiments of the present application may improve the user experience of the terminal by determining the service path for the terminal device to access the network using the QoS information of the to be initiated service.

The method of the embodiments of the present application mentioned in the foregoing may be performed by a terminal device, or may be performed by a service access management node, where the service access management node may be a certain functional entity in the core network device or a certain device other than the core network device. The terminal device will be taken as an example to describe the present solution in some places below for the convenience of description, but it should be understood that the following various solutions are equally applicable to the service access management node.

In the embodiments of the present application, the target service path includes a non 3rd Generation Partnership Project (non-3GPP) access path or a 3GPP access path. For example, the target service path may be an LTE network, and the target service path may also be a WLAN network. The target service path may also be a service path other than the above 3GPP access path and the non-3GPP access path, which will not be limited in the embodiments of the present application.

In the embodiment of the present application, the determining, according to quality of service (QoS) information of a to-be-initiated service of a terminal device, a target service path for the terminal device to access a network, includes: determining the target service path according to at least one of the following information: a QoS identifier, a source type, a priority, a service time delay requirement and a data packet error rate, and a first rule.

For a network service, the QoS includes a transmission bandwidth, a transmission time delay, a packet loss rate of data, etc. The quality of service may be improved by measures of ensuring the transmission bandwidth, reducing the transmission time delay, reducing the packet loss rate of data and time delay jitter, etc. in the network. The QoS may also include availability, throughput, or other parameters. Any parameters used to improve the quality of service may be used to determine the target service path, which will not be limited in the embodiments of the present application.

The network device may set a rule for various parameters in the QoS information in advance. For example, a certain parameter of the QoS information may be classified according to a certain rule, and one class corresponds to one service path. For example, the time delay requirement in the QoS information may be divided according to a threshold, the time delay requirement greater than the threshold corresponds to the 3GPP service path, and the time delay requirement less than the threshold corresponds to the non-3GPP service path.

It should be understood that the rules set for different parameters in the QoS information may be configured by a network, or may be agreed by using the protocol and is preset in the terminal device, such as a factory setting of the terminal device. The rules may also be agreed by signing a contract by the terminal device with the operator, which will not be limited in the embodiments of the present application.

In the embodiments of the present application, the first rule is a first correspondence relationship between the QoS identifier and the service path, and determining, according to the QoS identifier and the first rule, the target service path, includes: determining, according to the QoS identifier and the first correspondence relationship, the target service path.

Specifically, the network device may configure a corresponding relationship for the QoS identifier in advance. For example, the QoS identifier 1 may be configured to correspond to the target service path 1, the QoS identifier 2 may be configured to correspond to the target service path 2, etc., and the terminal device may determine the target service path according to the correspondence relationship after obtaining the QoS identifier of the to-be-initiated service.

In the embodiments of the present application, the first rule is a second correspondence relationship between the source type and the service path, and the determining, according to the source type, the target service path, includes: determining, according to the source type and the second correspondence relationship, the target service path.

Specifically, the network device may configure a correspondence relationship for the source type in advance. For example, the source type 1 may be configured to correspond to the target service path 1, the source type 2 may be configured to correspond to the target service path 2, etc., and the terminal device may determine the target service path according to the correspondence relationship after obtaining the source type of the to-be-initiated service.

In the embodiments of the present application, the determining, according to the priority and the first rule, the target service path, includes: determining the target service path as the 3GPP access path in case that the priority is greater than or equal to a first threshold; determining the target service path as the non-3GPP access path in case that the priority is less than the first threshold.

Specifically, the network device may configure a threshold for the priority in advance, for example, the one whose priority is greater than the threshold may be configured to correspond to target service path 1, the one whose priority is less than the threshold may be configured to correspond to target service path 2, etc., and the terminal device may determine the target service path according to the greater and less relationship between the priority and the threshold after obtaining the priority of the to-be-initiated service.

In the embodiments of the present application, the determining, according to the service time delay requirement and the first rule, the target service path, includes: determining the target service path as the non-3GPP access path in case that the service time delay requirement is greater than or equal to the first threshold; determining the target service path as the 3GPP access path in case that the service time delay requirement is less than the first threshold.

Specifically, the network device may configure a threshold for the service time delay requirement in advance, for example, the one whose service time delay requirement is greater than the threshold may be configured to correspond to the target service path 1, the one whose service time delay requirement is less than the threshold may be configured to correspond to the target service path 2, etc., and the terminal device may determine the target service path according to the greater and less relationship between the service time delay requirement and the threshold after obtaining the service time delay requirement of the to-be-initiated service.

In the embodiments of the present application, the determining, according to the data packet error rate and the first rule, the target service path, includes: determining the target service path as the non-3GPP access path in case that the data packet error rate is greater than or equal to the first threshold; determining the target service path as the 3GPP access path in case that the data packet error rate is less than the first threshold.

Specifically, the network device may configure a threshold for the data packet error rate in advance, for example, the one whose data packet error rate is greater than the threshold may be configured to correspond to target service path 1, the one whose data packet error rate is less than the threshold may be configured to correspond to target service path 2, etc., and the terminal device may determine the target service path according to the greater and less relationship between the data packet error rate and the threshold after obtaining the data packet error rate of the to-be-initiated service.

It should be understood that in the embodiments of the present application, the above is described by taking the QoS information, such as the QoS identifier, the source type, the priority, the service time delay requirement, and the a data packet error rate, as the example, and the embodiments of the present application is not limited thereto.

In the embodiments of the present application, the obtaining the quality of service (QoS) information of the to-be-initiated service, includes: obtaining the service performance information from a core network device, or from the terminal device, or from a device storing subscription information of the terminal device.

It should be understood that the above various thresholds and correspondence relationships may be configured by the network device, or may be agreed by using the protocol and is preset on the terminal device, or is agreed by signing a contract by the terminal device with the operator.

It should also be understood that in various embodiments of the present application, the size of the sequence numbers of each of the above processes do not imply a sequence of executions, and the order of execution of each of process should be determined by its function and internal logic, and should not constitute any limitation on the implementation process of the embodiments of the present application.

The method for determining a service path according to an embodiment of the present application is described in detail above. Hereinafter, an apparatus for determining a service path according to an embodiment of the present application will be described with reference to FIG. 4 to FIG. 7. The technical features described in the method embodiment are applicable to the following apparatus embodiment.

Figure 4:
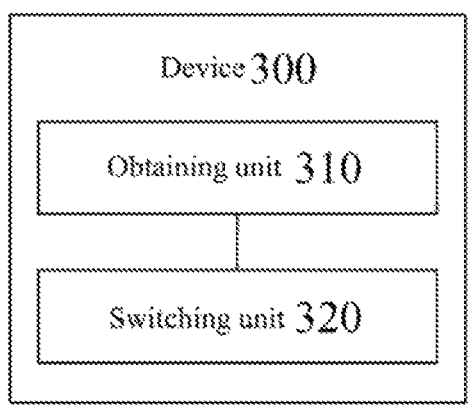
FIG. 4 shows a schematic block diagram of a device for determining a service path according to an embodiment of the present application.

FIG. 4 shows a schematic block diagram of a device 300 for determining a service path according to an embodiment of the present application. As shown in FIG. 4, the device 300 includes:

an obtaining unit 310, configured to obtain service performance information of a current service of a terminal device;

a switching unit 320, configured to switch a service path of the current service from a first service path to a second service path, where the service path is a path used by the terminal device to access a network.

Therefore, the device for determining the service path in the embodiments of the present application may improve the user experience of the terminal by monitoring the service performance of the current service to trigger the switching of the service path for the terminal device to access the network.

In the embodiments of the present application, the first service path is a non 3rd Generation Partnership Project (non-3GPP) access path, and the second service path is a 3GPP access path; or the first service path is a 3GPP access path, and the second service path is a non-3GPP access path.

In the embodiments of the present application, the service performance information includes throughput information and/or time delay information, where the switching unit is specifically configured to: switch the service path of the current service from the first service path to the second service path in case that the throughput information and/or the time delay information meets a trigger condition.

In the embodiments of the present application, the trigger condition is configured by the network device, or is preset in the terminal device, or is agreed by signing a contract by the terminal device.

In the embodiments of the present application, the switching unit is specifically configured to: switch the service path of the current service from the first service path to the second service path in case that throughput of the current service is less than a first threshold.

In the embodiments of the present application, the switching unit is specifically configured to: switch the service path of the current service from the first service path to the second service path in case that reduction speed of throughput of the current service is greater than a second threshold.

In the embodiments of the present application, the switching unit is specifically configured to: switch the service path of the current service from the first service path to the second service path in case that the time delay of the current service is greater than a third threshold.

In the embodiments of the present application, the switching unit is specifically configured to: switch the service path of the current service from the first service path to the second service path in case that time delay jitter of the current service is greater than a fourth threshold.

In the embodiments of the present application, the obtaining unit is specifically configured to: obtain the service performance information from a core network device, or from the terminal device, or from a device storing subscription information of the terminal device.

In the embodiments of the present application, the device is a terminal device or a service access management node.

In the embodiments of the present application, the service path is a path used by the terminal device to access the service access management node.

It should be understood that the device 300 according to the embodiments of the present application may correspond to the execution entity in the embodiment of the method 100 according to the present application, and the above and other operations and/or functions of each of the units in the device 300 are respectively used to implement corresponding processes of the device in the method shown in FIG. 2, which will not be repeated herein for brevity.

Figure 5:
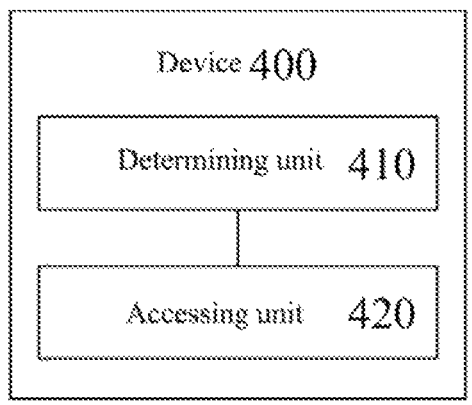
FIG. 5 shows another schematic block diagram of a device for determining a service path according to an embodiment of the present application.

FIG. 5 shows a schematic block diagram of a device 400 for determining a service path according to an embodiment of the present application. As shown in FIG. 5, the device 400 includes:

a determining unit 410, configured to determine, according to quality of service (QoS) information of a to-be-initiated service of a terminal device, a target service path for the terminal device to access a network;

an accessing unit 420, configured to access, according to the target service path, the terminal device to the network.

Therefore, the device for determining the service path according to the embodiments of the present application may improve the user experience of the terminal by determining the service path for the terminal device to access the network by using the QoS information of the to-be-initiated service.

In the embodiments of the present application, the target service path includes a non 3rd Generation Partnership Project (non-3GPP) access path or a 3GPP access path.

In the embodiments of the present application, the determining unit is specifically configured to: determine the target service path according to at least one of the following information: a QoS identifier, a source type, a priority, a service time delay requirement and a data packet error rate, and a first rule.

In the embodiments of the present application, the first rule is configured by the network device, is preset in the terminal device, or is agreed by signing a contract by the terminal device.

In the embodiments of the present application, the first rule is a first correspondence relationship between the QoS identifier and the service path, and the determining unit is specifically configured to: determine, according to the QoS identifier and the first correspondence relationship, the target service path.

In the embodiments of the present application, the first rule is a second correspondence relationship between the source type and the service path, and the determining unit is specifically configured to: determine, according to the source type and the second correspondence relationship, the target service path.

In the embodiments of the present application, the determining unit is specifically configured to: determine the target service path as the 3GPP access path in case that the priority is greater than or equal to a first threshold: determine the target service path as the non-3GPP access path in case that the priority is less than the first threshold.

In the embodiments of the present application, the determining unit is specifically configured to: determine the target service path as the non-3GPP access path in case that the service time delay requirement is greater than or equal to the first threshold; determine the target service path as the 3GPP access path in case that the service time delay requirement is less than the first threshold.

In the embodiments of the present application, the determining unit is specifically configured to: determine the target service path as the non-3GPP access path in case that the data packet error rate is greater than or equal to the first threshold;

determine the target service path as the 3GPP access path in case that the data packet error rate is less than the first threshold.

In the embodiments of the present application, the device further includes: an obtaining unit, configured to obtain the quality of service (QoS) information of the to-be-initiated service.

In the embodiments of the present application, the obtaining unit is specifically configured to: obtain the service performance information from a core network device, or from the terminal device, or from a device storing subscription information of the terminal device.

In the embodiments of the present application, the device is the terminal device or a service access management node.

It should be understood that the device 400 according to an embodiment of the present application may correspond to the execution entity in the embodiment of the method 200 according to the present application, and the above and other operations and/or functions of each of the units in the device 400 are respectively used to implement corresponding processes of the device in the method shown in FIG. 3, which will not be repeated herein for brevity.

Figure 6:
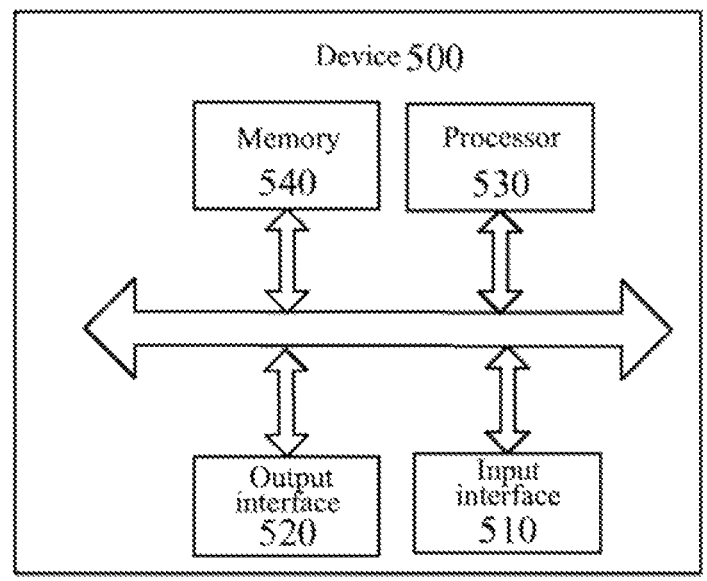
FIG. 6 shows still another schematic block diagram of a device for determining a service path according to an embodiment of the present application.

As shown in FIG. 6, the embodiments of the present application further provide a device 500 for determining a service path, and the device 500 may be the device 300 in FIG. 4, which may be used to execute contents of the execution entity corresponding to the method 100 of FIG. 2. The device 500 includes: an input interface 510, an output interface 520, a processor 530, and a memory 540. The input interface 510, the output interface 520, the processor 530, and the memory 540 may be connected by a bus system. The memory 540 is used for storing and including programs, instructions or codes, and the processor 530 is used for executing programs, instructions or codes in the memory 540 to control the input interface 510 to receive a signal, control the output interface 520 to transmit a signal, and complete the operations in the foregoing method embodiments.

Therefore, the device for determining a service path according to the embodiment of the present application may improve the user experience of the terminal by monitoring the service performance of the current service to trigger the switching of the service path for the terminal device to access the network.

It should be understood that, in the embodiments of the present application, the processor 530 may be a central processing unit (CPU), and the processor 530 may also be other general-purpose processors, a digital signal processor (DSP), an application specific integrated circuit (ASIC), a field programmable gate array (FPGA) or other programmable logic devices, a discrete gate or a transistor logic device, a discrete hardware component, etc. The general purpose processor may be a microprocessor, or it may be any conventional processors, or the like.

The memory 540 may include a read only memory and a random access memory and provides instructions and data to the processor 530. A part of the memory 540 may also include a non-volatile random access memory. For example, the memory 540 may also store information of the device type.

In an implementation process, each of the contents of the foregoing method may be completed by an integrated logic circuit of hardware in the processor 530 or by an instruction in a form of software. The contents of the method disclosed in the combination with the embodiments of the present application may be directly implemented to be performed and completed by a hardware processor, or may be performed and completed by a combination of hardware and software modules in the processor. The software module may be located in a conventional storage medium in the prior art such as a random access memory, a flash memory, a read only memory, a programmable read only memory or an electrically erasable programmable memory, a registers, or the like. The storage medium is located in the memory 540, and the processor 530 reads the information in the memory 540 and completes the contents of the foregoing method in combination with its hardware, which will not be described in detail herein for avoiding repeating.

In a specific implementation form, the obtaining unit and the switching unit of device 300 may be implemented by the processor 530 in FIG. 6.

Figure 7:
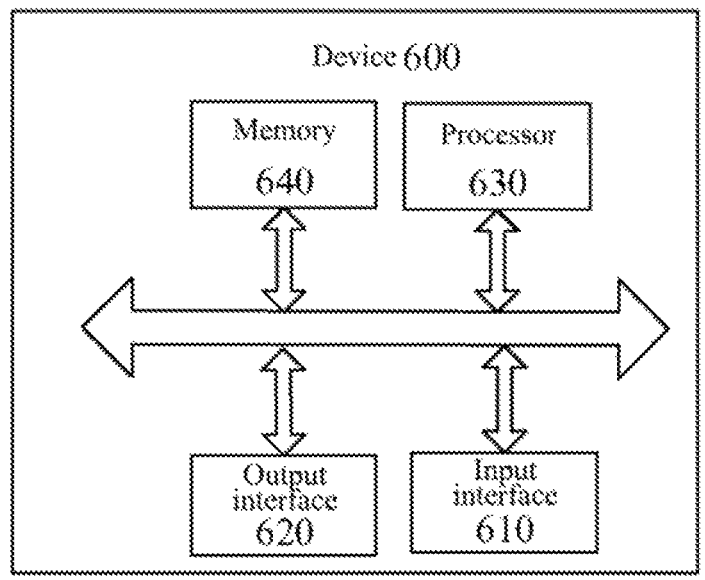
FIG. 7 shows still another schematic block diagram of a device for determining a service path according to an embodiment of the present application.

As shown in FIG. 7, the embodiments of the present application further provide a device 600 for determining a service path, and the device 600 may be the device 400 in FIG. 5, which may be used to execute contents of the device corresponding to the method 200 of FIG. 3. The device 600 includes: an input interface 610, an output interface 620, a processor 630, and a memory 640. The input interface 610, the output interface 620, the processor 630, and the memory 640 may be connected by a bus system. The memory 640 is used for storing and including programs, instructions or codes. The processor 630 is used for executing programs, instructions or codes in the memory 640 to control the input interface 610 to receive a signal, control the output interface 620 to transmit a signal, and complete the operations in the foregoing method embodiments.

Therefore, the terminal device according to the embodiments of the present application may improve the user experience of the terminal by determining the service path for the terminal device to access the network using the QoS information of the to-be-initiated service.

It should be understood that, in the embodiments of the present application, the processor 630 may be a central processing unit (CPU), and the processor 630 may also be other general-purpose processors, a digital signal processor (DSP), an application specific integrated circuit (ASIC), a field programmable gate array (FPGA) or other programmable logic devices, a discrete gate or a transistor logic device, a discrete hardware component, etc. The general purpose processor may be a microprocessor, or it may be any conventional processors or the like.

The memory 640 can include a read only memory and a random access memory and provides instructions and data to the processor 630. A part of the memory 640 may also include a non-volatile random access memory. For example, the memory 640 may also store information of the device type.

In an implementation process, each of the contents of the foregoing method may be completed by an integrated logic circuit of hardware in the processor 630 or by an instruction in a form of software. The contents of the method disclosed in combination of the embodiments of the present application may be directly implemented to be performed and completed by a hardware processor, or may be performed and completed by a combination of hardware and software modules in the processor. The software module may be located in a conventional storage medium such as a random access memory, a flash memory, a read only memory, a programmable read only memory or an electrically erasable programmable memory, a registers, or the like. The storage medium is located in the memory 640, and the processor 630 reads the information in the memory 640 and completes the contents of the foregoing method in combination with its hardware, which will not be described in detail herein for avoiding repeating.

In a specific implementation form, the determining unit, the accessing unit and the obtaining unit in the device 400 may be implemented by the processor 630 in FIG. 7.

Those of ordinary skill in the art will appreciate that units and algorithm steps of each of examples described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, the specific working process of the system, the apparatus and the unit described above may refer to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation, for example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each of functional units in each of the embodiments of the present application may be integrated into one monitoring unit, or each of units may physically exist alone, or two or more units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes instructions for enabling a computer device (which may be a personal computer, a server, or a network device, etc.) to perform all or part of the steps described in methods in each of the embodiments of the present application. The above storage medium includes various medium that may store program code, such as a U disk, a mobile hard disk, a read-only memory (ROM), a random access memory (RAM), a magnetic disk, or an optical disk, or the like.

The above is only a specific implementation form of the present application, the scope of protection of the present application is not limited thereto, and changes or substitutions that may easily be derived by those skilled in the art within the technical scope disclosed in the present application should be covered by the scope of protection of the present application. Therefore, the scope of protection of the present application should be subject to the scope of protection of the claims.

What is claimed is:

1. A method for determining a service path, comprising:
    obtaining service performance information of a current service of a terminal device;
    switching, according to the service performance information, a service path of the current service from a first service path to a second service path, wherein the service path is a path used by the terminal device to access a network;
    wherein the service performance information comprises throughput information and time delay information, and the switching, according to the service performance information, a service path of the current service from a first service path to a second service path, comprises:
    switching the service path of the current service from the first service path to the second service path in case that the throughput information and the time delay information meet a trigger condition;
    the switching the service path of the current service from the first service path to the second service path in case that the throughput information and the time delay information meet a trigger condition, comprises:
    switching the service path of the current service from the first service path to the second service path in case that throughput of the current service increases exponentially and speed at which a time delay jitter of the current service is increased is greater than a threshold;
    wherein the obtaining service performance information of a current service of a terminal device, comprises:
    obtaining the service performance information of the current service of the terminal device from a device storing subscription information of the terminal device, wherein the service performance information is monitored in real time by the device storing subscription information of the terminal device.

2. The method according to claim 1, wherein the first service path is a non 3rd Generation Partnership Project (non-3GPP) access path, and the second service path is a 3GPP access path, or the first service path is the 3GPP access path, and the second service path is the non-3GPP access path.

3. The method according to claim 1, wherein the trigger condition is configured by a network device, or is preset in the terminal device, or is agreed by signing a contract by the terminal device.

4. The method according to claim 1, wherein the switching the service path of the current service from the first service path to the second service path in case that throughput of the current service increases exponentially and speed at which a time delay jitter of the current service is increased is greater than a threshold, further comprises:
    switching the service path of the current service from the first service path to the second service path in case that throughput of the current service is less than a first threshold.

5. The method according to claim 1, wherein the service path is a path used by the terminal device to access a service access management node.

6. A device for determining a service path, comprising a processor, an input interface, and a memory, and the memory is configured to store an instruction, and the processor is configured to execute the instruction stored in the memory to:
    control the input interface to obtain service performance information of a current service of a terminal device;
    switch a service path of the current service from a first service path to a second service path, wherein the service path is a path used by the terminal device to access a network;
    wherein the service performance information comprises throughput information and time delay information, and the processor is specifically configured to:
    switch the service path of the current service from the first service path to the second service path in case that the throughput information and the time delay information meet a trigger condition;
    wherein the processor is specifically configured to:

switch the service path of the current service from the first service path to the second service path in case that throughput of the current service increases exponentially and speed at which a time delay jitter of the current service is increased is greater than a threshold;

wherein the processor is specifically configured to:

control the input interface to obtain the service performance information of the current service of the terminal device from a device storing subscription information of the terminal device, wherein the service performance information is monitored in real time by the device storing subscription information of the terminal device.

7. The device according to claim 6, wherein the first service path is a non 3rd Generation Partnership Project (non-3GPP) access path, and the second service path is a 3GPP access path; or the first service path is a 3GPP access path, and the second service path is a non-3GPP access path.

8. The device according to claim 6, wherein the trigger condition is configured by a network device, or is preset in the terminal device, or is agreed by signing a contract by the terminal device.

9. The device according to claim 6, wherein the processor is specifically configured to:

switch the service path of the current service from the first service path to the second service path in case that throughput of the current service is less than a first threshold.

10. The device according to claim 6, wherein the device is the terminal device or a service access management node.

11. The device according to claim 6, wherein the service path is a path used by the terminal device to access a service access management node.

* * * * *